US007028602B2

(12) United States Patent
Breuer et al.

(10) Patent No.: US 7,028,602 B2
(45) Date of Patent: Apr. 18, 2006

(54) LINEAR, HYDRAULIC PIVOT DRIVE

(75) Inventors: Ulf Breuer, Grasberg (DE); Peter Jaenker, Riemerling (DE); Thomas Lorkowski, Unterhaching (DE)

(73) Assignees: EADS Deutschland GmbH, Ottobrunn (DE); Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/505,678

(22) PCT Filed: Feb. 21, 2003

(86) PCT No.: PCT/DE03/00541

§ 371 (c)(1),
(2), (4) Date: Aug. 25, 2004

(87) PCT Pub. No.: WO03/072955

PCT Pub. Date: Sep. 4, 2003

(65) Prior Publication Data

US 2005/0178927 A1 Aug. 18, 2005

(30) Foreign Application Priority Data

Feb. 25, 2002 (DE) ................................ 102 07 830

(51) Int. Cl.
*F15B 15/08* (2006.01)
*B64C 13/36* (2006.01)

(52) U.S. Cl. ............................................ 92/136; 74/25

(58) Field of Classification Search .................... 92/31, 92/32, 136; 74/25, 26
See application file for complete search history.

(56) References Cited

U.S. PATENT DOCUMENTS

| | | | |
|---|---|---|---|
| 4,603,616 | A | 8/1986 | Zajac |
| 2003/0102410 | A1 | 6/2003 | Gessler et al. |

FOREIGN PATENT DOCUMENTS

| | | | |
|---|---|---|---|
| DE | 1 024 804 | | 2/1958 |
| DE | 26 813 | * | 1/1964 |
| DE | 196 28 117 | | 1/1998 |
| DE | 101 56 733 | | 6/2003 |
| GB | 2 299 562 | | 10/1996 |

* cited by examiner

*Primary Examiner*—Thomas E. Lazo
(74) *Attorney, Agent, or Firm*—Crowell & Moring LLP

(57) ABSTRACT

The invention relates to a linear, hydraulic pivot drive, especially for the flap control system of aerodynamic structures. Said pivot drive comprises a housing provided with ports for introducing a hydraulic medium, a piston which is arranged inside the housing and can be axially displaced by the effect of the hydraulic medium, and an output shaft which is provided with coarse threads and interacts with the piston in order to cover the axial displacement of the piston into a rotational movement. The invention is characterized in that the output shaft is integrated into the piston, the coarse threads running in the same direction and engaging in the piston, and the cross-section of the piston has a spline profile for effectively preventing a rotational movement of the piston.

19 Claims, 3 Drawing Sheets

LINEAR, HYDRAULIC PIVOT DRIVE

BACKGROUND AND SUMMARY OF THE INVENTION

The present invention relates to a linear hydraulic pivot drive.

Linear drives of this type are used, for example, for the flap control of aerodynamic profiles. Here, it is particularly advantageous that conventional rod linkages or control rods can be eliminated which are pivotally connected to the control flap outside the aerodynamic profile and thus have a negative influence on the aerodynamic conditions.

A known drive for controlling a rotor blade aileron is described, for example, in British Patent Document GB 2 299 562 A. For converting a hydraulically caused axial movement of a shaft to a rotational movement, the shaft is provided with a coarse thread. The coarse thread engages in several bushes which concentrically surround the shaft, so that the bushes undergo a rotation during the axial displacement of the shaft. In this case, a torque support of the shaft is required in order to effectively prevent its rotation. This is caused by an additional mechanism which secures the shaft. The mechanism comprises several components; among others, separate bores into which the shaft is introduced, as well as detent pins. This type of an arrangement not only has relatively large dimensions but also causes intensive mounting and maintenance work.

In addition, so-called coarse-thread swivel motors are known which convert an axial displacement of a hydraulic working piston by way of coarse threads to a rotational movement of an output shaft. The torque support of the working piston takes place, for example, by two threads which extend in opposite directions and which engage in the piston on both sides. However, this results in an opposite rotating direction of the output shaft, which is undesirable for some applications. In addition to being arranged axially behind one another, the threads can also be arranged in a radially nesting manner. In this case, particularly because of the not arbitrarily reducible pitch of the coarse threads, an arbitrary reduction of the arrangement cannot be achieved. Therefore, commercial drives, as a rule, are relatively large. It is also disadvantageous that, in the case of such conventional hydraulic pivot drives, there is a concentration on spot-type load distributions.

Recently, aerodynamic structures have been developed which have smaller flap arrangements (so-called miniflaps), which differ from conventional flaps with a 10–30% clean wing depth in that they have a depth of only 1–3% and, as in the case of a split flap, consist of a stationary and of a swung-out part. An aerodynamic profile with such a miniflap is described, for example, in our unpublished Patent Application DE 101 56 733 (corresponding U.S. 2003/102410). A deflection of the miniflap by means of conventional adjusting levers would not only cause unfavorable flow conditions but also result in a high weight since several adjusting levers would be required. Likewise, high mounting as well as maintenance expenditures would be necessary.

New actuator systems are therefore required which, in particular, meet the demands of a high miniaturization. Because of the structural demands, only a very limited installation space is available. The flap actuator system should be aimed at a greater integration of the functional tasks of the drive and the bearing structure. In addition, a linear or plane distribution of force or power is desirable in order to meet the flap-specific demands.

It is therefore an object of the present invention to create a linear hydraulic pivot drive which has a small size as well as a simple construction, so that it can be integrated in existing structures and requires low maintenance expenditures.

This object is achieved by means of a linear hydraulic pivot drive which comprises a housing with connections for introducing a hydraulic medium, a piston arranged inside the housing, which piston is axially displaceable by the action of the hydraulic medium, as well as an output shaft provided with coarse threads, which output shaft interacts with the piston in order to convert the axial movement of the piston to a rotational movement, and, according to the invention, is characterized in that the output shaft is integrated in the piston, the coarse threads being constructed to run in the same direction and engaging in the piston, and in that the piston cross-section has a spline profile in order to effectively prevent a rotational movement of the piston.

By constructing the piston cross-section in the form of a spline profile, the torque support for preventing a rotation of the piston is ensured by the latter itself. Expediently, the spline profile is provided in the engaging area of the output shaft and the piston; that is, in the cross-sectional area of the piston where the mutual engagement of the output shaft and the piston takes place. As an alternative, the spline profile may be constructed along the entire piston. The spline profile preferably is a P4C-profile according to DIN Standard 32712. Here, it is particularly advantageous that the axial displaceability is ensured under the force of moments. In this manner, no additional mechanisms and components are required in order to prevent a rotation of the piston. A simple construction is ensured. Furthermore, it is advantageous that, as a result of such a design, the pivot drive is significantly smaller than known arrangements. It is particularly expedient in this case that the output shaft is integrated in the piston on both sides.

It is particularly advantageous that the output shaft has two separate sections at whose respective ends engaging in the piston the coarse threads are arranged which run in the same direction. In this manner, it is achieved that the rotating direction of the output shaft sections is identical.

The output shaft sections are preferably mutually connected in a rotationally symmetrical manner by way of a spacing pin, the spacing pin being introduced into respective bores provided in the output shaft sections. This is advantageous particularly with respect to the mounting as well as the maintenance.

Expediently, the piston is equipped with threaded bushes on both sides, the coarse threads of the output shaft sections engaging in these bushes. As mentioned above, in this manner a uniform rotating direction of the output shaft sections is obtained. This also ensures a force transmission which is as high as possible.

Further, it is advantageous that the piston has a central bore, the spacing pin extending through this central bore. The spacing pin is thereby disposed in a simple manner. For this purpose, a bearing may be arranged in the central bore.

Expediently, axial-radial bearings, preferably roller bearings, are provided for the bearing of the output shaft. As an alternative, the axial and radial components may also be constructed separately. These bearings permit a good absorption of axial as well as of radial forces.

It is particularly advantageous to integrate the axial-radial bearings in housing covers which, in turn, tightly close off the housing. This advantageously results in a compact type of construction.

Furthermore, it is expedient that the hydraulic medium can be bidirectionally introduced into the housing, which permits a swivelling of a flap, which is pivotally linked to the housing, in different directions.

The pivot drive according to the invention is used particularly for the flap deflection at rotor blades or airplane wings. In this case, it is particularly advantageous to integrate the drive in a hinge joint of a flap hinged to an aerodynamic profile, a plurality of such drives being linearly integrated in the hinge joint.

In the following, the invention will be explained in detail by means of the attached drawings.

DETAILED DESCRIPTION OF THE DRAWINGS

Figure 1:
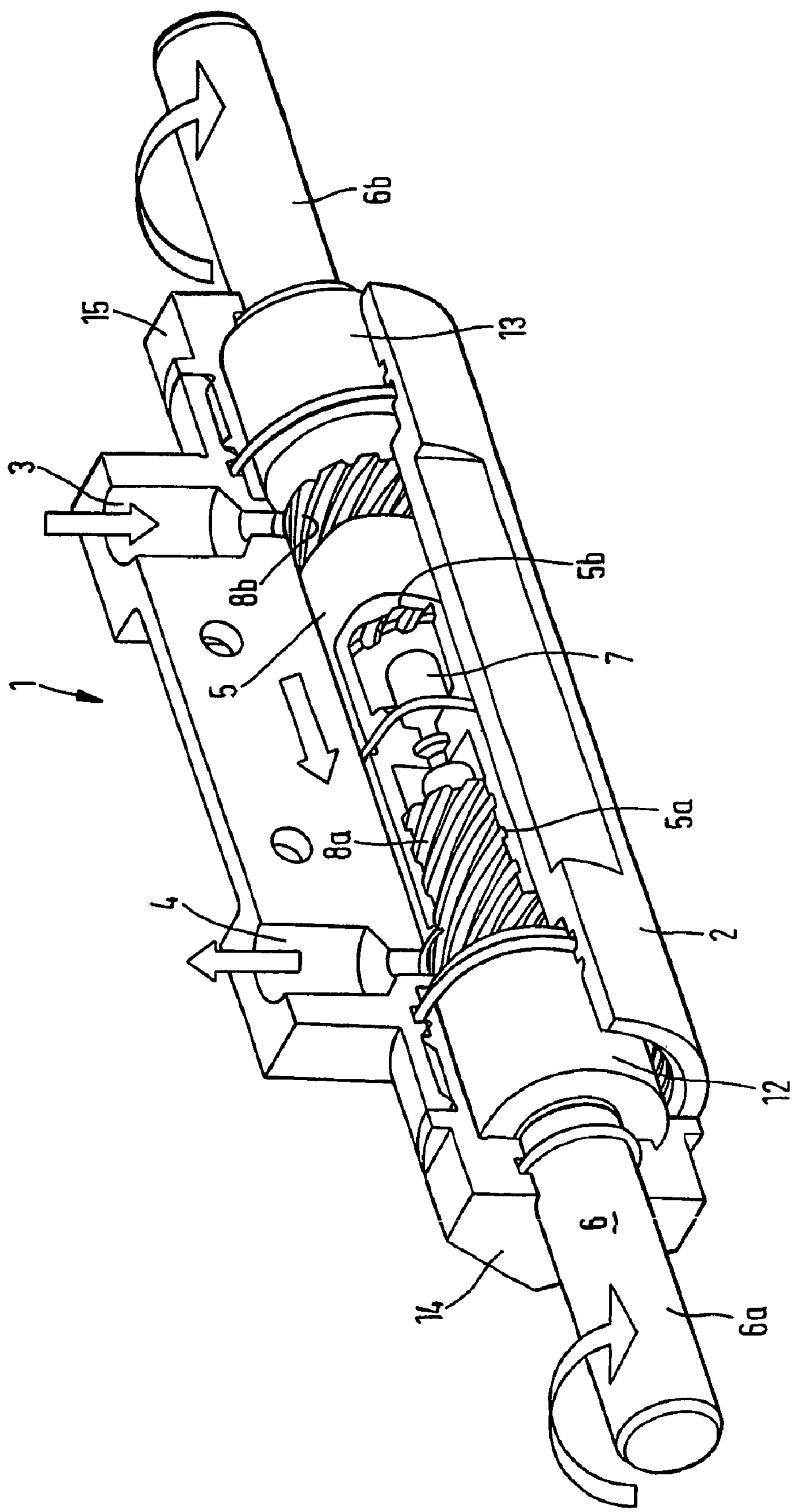
FIG. 1 is a schematic three-dimensional representation of the pivot drive according to the invention.

FIG. 1 is a three-dimensional view of a linear hydraulic pivot drive 1 according to the invention for converting an axial movement to a rotational movement. The drive comprises a housing 2 which has two connections 3, 4 for a hydraulic medium (such as a fluid). A piston 5 as well as an output shaft 6 connected with the piston 5 are arranged in the interior of the housing 2. For a better representation, the housing 2 as well as the piston 5 are partially illustrated in FIG. 1 in a sectional view. The output shaft 6 is placed on both sides in the symmetrically constructed piston 5. In order to facilitate the introduction as well as the maintenance of the pivot drive, the output shaft 6 preferably consists of two separate sections 6*a*, 6*b*. The ends of the output shaft sections 6*a*, 6*b*, which each engage in the piston 5, are provided with coarse threads 8*a*, 8*b* running in the same direction. By means of the coarse threads 8*a*, 8*b* constructed to be running in the same direction, it is ensured that the rotating direction of the two output shaft sections 6*a*, 6*b* is identical, which will be described in greater detail in the following.

Figure 2:
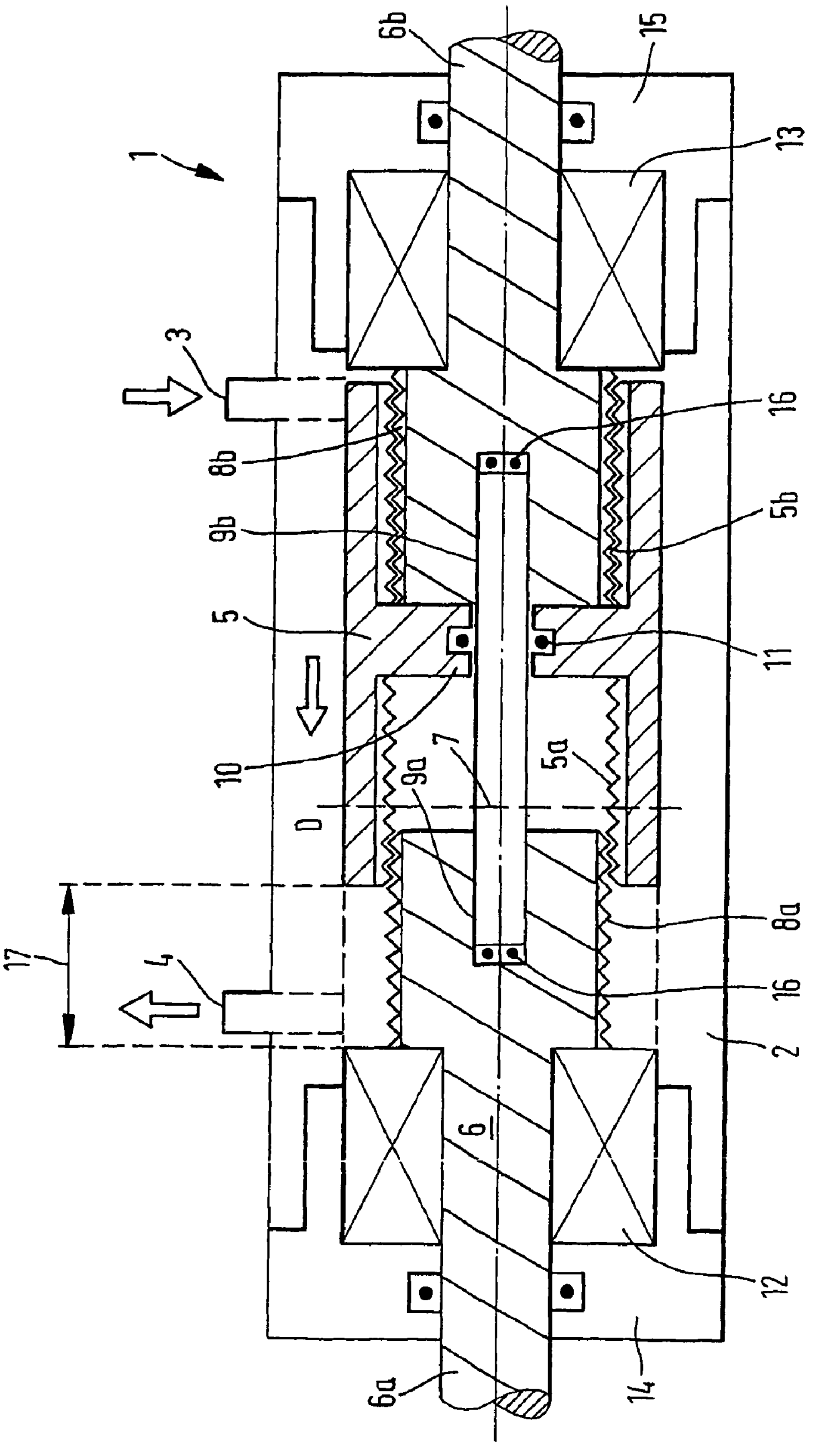
FIG. 2 is a sectional view of the pivot drive according to the invention.

As better illustrated in FIG. 2, the piston 5 is correspondingly provided with threads 5*a*, 5*b* on both sides in order to ensure the engagement of the drive shaft sections 6*a*, 6*b* in the piston 5. The threads 5*a*, 5*b* are suitably further developed in the form of threaded bushes. Inside the piston 5, the two output shaft sections 6*a*, 6*b* are mutually connected in a rotationally symmetrical manner by way of a spacing pin 7 (FIG. 2). For this purpose, the piston 5 is provided with a central bore 10 in which the spacing pin 7 is disposed, preferably by using a sealing ring 11. The spacing pin 7 is simultaneously introduced into corresponding bores 9*a*, 9*b* placed in the output shaft sections 6*a*, 6*b*. A prestressing of the spacing pin 7 can be achieved by suitable elastic elements 16 (such as rubber devices, or the like), which are introduced into the bores 9*a*, 9*b* in the same manner. A rotationally symmetrical shaft set is created in this fashion which essentially consists of output shaft sections 6*a*, 6*b* and the spacing pin 7.

The bearing of the shaft set inside the housing 2 has to absorb a portion of the force axially generated by the piston 5. In addition, the output shaft 6 has to be guided in the radial direction. This takes place by axial-radial bearings which have the reference numbers 12 and 13 in FIGS. 1 and 2. As an alternative, the axial or radial components of the bearings can have a separate construction. However, roller bearings are preferably used. The bearings 12, 13 are typically integrated in the housing cover 14, 15 which tightly close off the housing 2 in each case on both sides. In this case, the dimensions of the individual components are mutually coordinated such that the shaft set is axially prestressed by the housing covers 14, 15 in connection with the elastic element 16.

Figure 3:
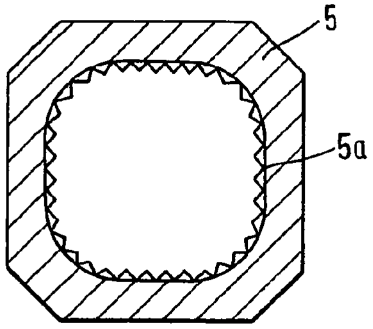
FIG. 3 is a cross-sectional view of the piston used in the pivot drive according to the invention.

In the following, the method of operation of the pivot drive according to the invention will be described by means of FIGS. 1 and 2. By way of the connection 3, the hydraulic medium is introduced into the housing 2 in the direction of the arrow. Because of the pressure thereby acting upon the piston 5, the latter is displaced axially to the left (see direction of the arrow). In order to convert the axial movement of the piston 5 to a rotational movement of the output shaft 6, which, as described above, interacts with the piston 5 by way of the coarse threads 8*a*, 8*b*, a torque support is required. In other words, the rotational movement of the piston 5 has to be effectively prevented because otherwise the axial movement cannot be converted to a rotational movement. According to the invention the torque support is ensured by the cross-sectional shape of the piston 5 itself. For this purpose, the cross-section of the piston 5 has a spline profile, which preferably is a P4C-profile according to DIN Standard 32712. In this case, the spline profile extends essentially along the cross-sectional area which is provided with the threads 5*a*, 5*b*; that is, the spline profile is essentially arranged where the coarse threads 8*a*, 8*b* of the output shaft 6 engage in the piston 5. In the following, the term “engagement area” will also be used for this purpose. Naturally, the spline profile may also extend along the entire length of the piston 5. A sectional view of the piston 5 along Line D, D' illustrated in FIG. 2 is contained in FIG. 3. Such a spline profile, on the one hand, permits the transmission of sufficient force to the output shaft and, on the other hand, ensures a so-called “slipping” of the output shaft 6, which, in turn, prevents a rotation of the piston 5.

For reversing the rotating direction of the output shaft 6 or of the pivoting direction of the drive 1, only the inlet direction of the hydraulic medium is changed. The connection 4 becomes the inlet, and the connection 3 becomes the outlet for the hydraulic medium. The introduction of the medium therefore takes place bidirectionally depending on the desired pivoting direction. It is also noted that the piston stroke, which has the reference number 17 in FIG. 2, and the thread pitch are mutually coordinated in order to obtain a predefined deflection angle. In addition, the pitch of the thread should be so large that no self-locking of the drive will occur. In this case, the drive is the more efficient, the coarser the thread. With the coarseness of the thread, the axial required movement of the piston (stroke 17) will also increase for reaching a defined pivoting angle. Simultaneously, the hydraulic working volume and thus a precise positioning or controllability of the pivoting angle is simplified.

Figure 4:
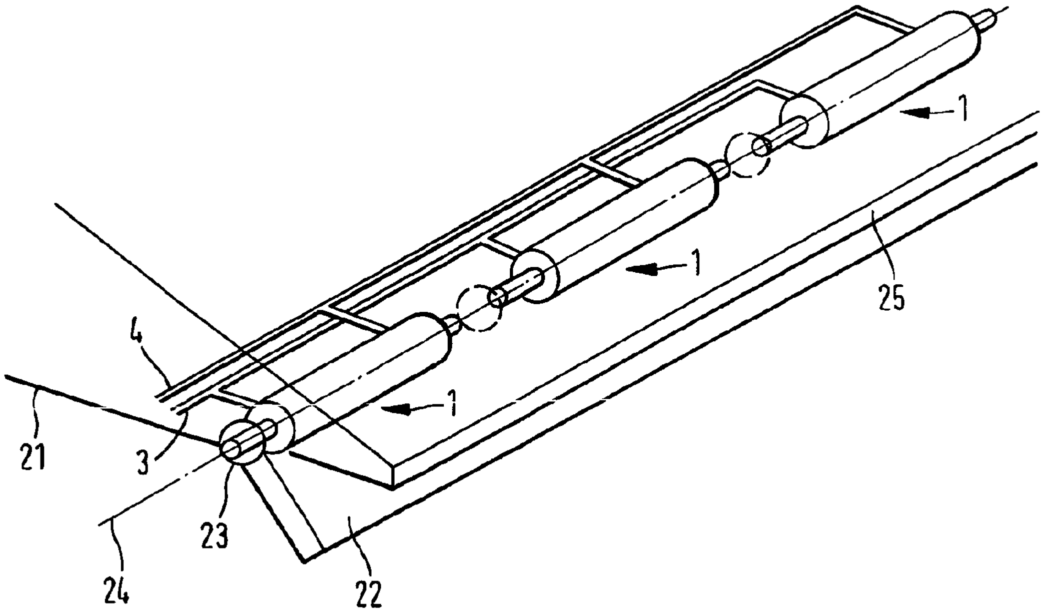
FIG. 4 is a view of several, linearly arranged pivot drives which are integrated in a hinge joint of a flap hinged to an aerodynamic profile.

FIG. 4 shows a use of the pivot drive according to the invention for deflecting a so-called miniflap. FIG. 4 is a schematic view of the rearward end of an aerodynamic profile 20. A flap 22 is pivotally connected to the underside 21 of the profile 20 by way of a hinge-type connection 23. The swivelling axis 24 of the hinge joint 23 extends parallel to the trailing edge 25 of the profile. In order to achieve a uniform transmission of force along the swivelling axis 24, several pivot drives 1 according to the invention are arranged in a linear or rod-shaped fashion. The connections 3, 4 of the individual pivot drives 1 are preferably supplied in parallel. The inflow of the hydraulic medium again takes place bidirectionally, depending on the desired pivoting direction. By means of such an arrangement, the actuating forces are introduced in a plane manner and not, as previously, in a point-type manner. Because of the small size of the pivot drive 1, the "broomstick arrangement" illustrated in FIG. 4 can be integrated in the hinge joint 23. Such integrated, rotationally symmetrical actuator systems have been produced with diameters smaller than 28 mm. The diameter of the pivot drive preferably amounts to not more than 20 mm.

The invention claimed is:

1. Linear hydraulic pivot drive, comprising:

a housing having connections for introducing a hydraulic medium, a piston which is arranged inside the housing and is axially displaceable by the effect of the hydraulic medium, and an output shaft which is equipped with coarse threads and interacts with the piston for converting axial movement of the piston to a rotational movement of the output shaft, wherein the output shaft has two separate partial sections which are placed in the piston on both sides and engage in the piston by way of coarse threads constructed to be running in the same direction such that a torque with an identical rotating direction can be picked up at the two partial sections, the piston cross-section having a spline profile for preventing a rotational movement of the piston.

2. Linear hydraulic pivot drive according to claim 1, wherein the spline profile is provided essentially in an engagement area of the output shaft and the piston.

3. Linear hydraulic pivot drive assembly comprising a plurality of drives according to claim 2 arranged in a linear manner in order to obtain a uniform transmission of force along their linear course.

4. Linear hydraulic pivot drive assembly according to claim 3, wherein the hydraulic connections of the individual drives are connected in parallel.

5. Use according to claim 4, wherein the aerodynamic profile is a rotor blade.

6. Linear hydraulic pivot drive according to claim 1, wherein the spline profile is a P4C profile.

7. Linear hydraulic pivot drive according to claim 1, wherein the output shaft has two separate output shaft sections which each engage in the piston, and have coarse threads arranged at their respective ends which run in the same direction.

8. Linear hydraulic pivot drive according to claim 7, wherein the output shaft sections are mutually connected in a rotationally symmetrical manner by way of a spacing pin, the spacing pin being introduced into respective bores of the output shaft sections.

9. Linear hydraulic pivot drive according to claim 8, wherein the piston has a central bore for guiding the spacing pin.

10. Linear hydraulic pivot drive according to claim 1, wherein the piston is provided with threaded bushes on both sides, the coarse threads of the output shaft sections engaging in these threaded bushes.

11. Linear hydraulic pivot drive according to claim 1, wherein axial-radial bearings are provided for bearing the output shaft.

12. Linear hydraulic pivot drive according to claim 11, wherein the axial-radial bearings are roller bearings.

13. Linear hydraulic pivot drive according to claim 11, wherein the axial-radial bearings are integrated in the housing covers, the housing covers closing off the housing on both sides.

14. Linear hydraulic pivot drive according to claim 1, wherein the hydraulic medium can be introduced into the housing in a bidirectional manner.

15. Linear hydraulic pivot drive assembly comprising a plurality of drives according to claim 1 arranged in a linear manner in order to obtain a uniform transmission of force along their linear course.

16. Linear hydraulic pivot drive assembly according to claim 15, wherein the hydraulic connections of the individual drives are connected in parallel.

17. Use of the drive according to claim 1 for deflecting a flap of an aerodynamic profile.

18. Use according to claim 17, wherein the aerodynamic profile is an airplane wing.

19. Use of the drive according to claim 1 for deflecting a flap pivotally connected to an aerodynamic profile by way of a hinge joint, a plurality of such drives being linearly integrated in the hinge joint.

* * * * *